3,022,318
DERIVATIVES OF 3-PHENYL-SPIRO(2H,1-BENZOPYRAN-2,2'[2'H,1'-BENZOPYRAN])

Elliot Berman and David B. McQuain, Dayton, Ohio, assignors to The National Cash Register Company, Dayton, Ohio, a corporation of Maryland
No Drawing. Filed July 15, 1959, Ser. No. 827,175
1 Claim. (Cl. 260—345.2)

This invention relates to derivatives of the compound 3-phenyl-spiro(2H,1 - benzopyran-2,2'- [2'H,1 - benzopyran]) having the structure

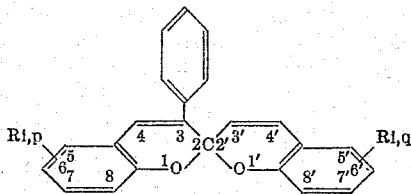

when the expression $$0.50 \leq (-1.2) \sum_{5 \leq p \leq 8} \sigma(R_i,p) + \sum_{5' \leq q \leq 8'} \sigma(R_i,q) \leq 1.50$$

is satisfied, the $\sigma$ values being taken of sterically compatible substituents from Table I.

These compounds in solution, liquid or solid, normally are colorless but are changed to a colored state when subjected to light predominating in blue through ultra-violet wave-lengths, and thereafter are reversible to the colorless state by being subjected in solution, liquid or solid, to light predominating in green through infra-red wave-lengths.

These compounds generally may be reversed from the colored state to the uncolored state by thermal activity induced by the application of heat. The compounds may be stabilized against change to the colored or uncolored state by evaporation of the solvent, if it be of an evaporable sort. These compounds are remarkable for their broad-band light-absorption in the colored state, which is grayish, because the absorption encompasses the visible region of the light spectrum.

These compounds are useful in sensitizing record materials so as to exhibit data by colored and uncolored areas thereon, which data has been selectively recorded thereon, or erased therefrom, by the application of recording light or erasing light or heat.

Solutions of the compounds are also useful as components of optical filters which darken on being subjected to ultra-violet or blue light, such filters being adapted for protecting the eyes from tissue-damaging light or from temporarily-induced blindness from excessive light, inasmuch as they respond immediately to the coloring light waves which accompany any great excesses of visible light. The reversion to the colorless state is automatic in normal ambient light, and reversions in the dark may occur at normal room temperature, which with some derivatives must be assisted by heating.

TABLE I
*Sigma values = σ*

| | i | Ring Position | | | |
|---|---|---|---|---|---|
| | | 8;8' | 5'–6' | 5;5': 7;7' | 6;6' |
| (1) | zero | 0.00 | | 0.00 | 0.00 |
| (2) | CH₃ | −0.17 | | −0.069 | −0.306 |
| (3) | CH₂CH₃ | −0.16 | | −0.0625 | −0.291 |
| (4) | CH(CH₃)₂ | −0.15 | | −0.0589 | −0.276 |
| (5) | C(CH₃)₃ | −0.14 | | −0.0581 | −0.250 |
| (6) | C₆H₅ | 0.00 | | +0.06 | −0.01 |
| (7) | CF₃ | | | +0.43 | +0.54 |
| (8) | CN | | | +0.56 | +0.66 |
| (9) | COCH₃ | | | +0.376 | +0.502 |
| (10) | CO₂C₂H₅ | | | +0.37 | +0.45 |
| (11) | CO₂H | | | +0.37 | +0.45 |
| (12) | NH₂ | | | −0.16 | −0.66 |
| (13) | NHCH₃ | | | | −0.84 |
| (14) | N(CH₃)₂ | | | | −0.83 |
| (15) | NHCOCH₃ | | | +0.21 | 0.0 |
| (16) | N(CH₃)₃⁺ | | | +0.88 | +0.82 |
| (17) | NO₂ | +0.80 | | +0.662 | +0.777 |
| (18) | PO₃H⁻ | | | +0.2 | +0.26 |
| (19) | OCH₃ | −0.39 | | +0.0465 | −0.764 |
| (20) | OC₂H₅ | −0.35 | | +0.1 | −0.24 |
| (21) | O(CH₂)₂CH₃ | | | +0.1 | −0.25 |
| (22) | O(C₆H₅) | | | +0.252 | −0.32 |
| (23) | OH | | | +0.121 | −0.37 |
| (24) | OCOCH₃ | | | +0.39 | +0.31 |
| (25) | SCH₃ | | | +0.15 | 0.0 |
| (26) | SH | | | +0.25 | +0.15 |
| (27) | SCOCH₃ | | | +0.39 | +0.44 |
| (28) | SCN | | | | +0.52 |
| (29) | SOCH₃ | | | +0.52 | +0.49 |
| (30) | SO₂CH₃ | | | +0.60 | +0.72 |
| (31) | SO₂NH₂ | | | +0.46 | +0.57 |
| (32) | S(CH₃)₂⁺ | | | +1.00 | +0.90 |
| (33) | F | +0.24 | | +0.337 | −0.0714 |
| (34) | Cl | +0.20 | | +0.373 | +0.112 |
| (35) | Br | +0.21 | | +0.391 | +0.148 |
| (36) | I | +0.21 | | +0.352 | +0.132 |
| (37) | IO₂ | | | +0.70 | +0.76 |
| (38) | CH₂CH=CH₂ | −0.16 | | −0.0625 | −0.291 |
| (39) | CO₂CH₃ | +0.45 | | +0.37 | +0.45 |
| (40) | 5'—⌬(6')—NO₂ | | +0.88 | | |

Reference is made to an application of Elliot Berman for United States Letters Patent, Serial No. 827,420, filed July 14, 1959, for details of how the novel derivative compounds of this application may be incorporated in an eye-protecting filter. Reference is also made to applicant Elliot Berman's application for United States Letters Patent Serial No. 654,578, filed April 23, 1957, relative to the use of such compounds in a record sheet on which data may be selectively recorded by light and erased therefrom by light.

In general, the novel derivative compounds are made by condensing a selectively-substituted salicylaldehyde (giving the substituents on the 5, 6, 7, and 8 positions in the final product) with benzyl methyl ketone, in ethanol as a solvent and piperidine as a catalyst, to form a first intermediate, then condensing the said first intermediate with a selectively-substituted salicylaldehyde (giving the substituents in the 5', 6', 7', and 8' positions in the final product) with glacial acetic acid as a solvent and hydrogen chloride bubbled through as a catalyst.

EXAMPLE I

As the preferred embodiment, the preparation of the derivative 3-phenyl-6'nitro-spiro(2H,1-benzopyran-2,2'[2'-H,1'benzopyran]) will be described as exemplary. First, 2-hydroxystyryl-α-phenyl methyl ketone is prepared by condensing salicylaldehyde with benzyl methyl ketone in molar proportions, specifically as follows: In a 250-milliliter Erlenmeyer flask are placed 26.8 grams (0.20 mole) of benzyl methyl ketone, 24.4 grams (0.20 mole) of salicylaldehyde, and 40 milliliters of absolute ethanol. Then 20 drops of piperidine are added, the solution becoming orange in color. The solution is then allowed to stand for several days, until yellow acicular crystals are formed, which crystals are recovered by repeated filtration, dissolved in ethanol, decolorized with activated charcoal, and recrystallized to yield white acicular crystals, which, when recrystallized, have a melting range of 178 degrees to 179 degrees centigrade, which is the first intermediate. The final product is prepared by condensing molar quantities of said first intermediate with 5-nitrosalicylaldehyde, specifically as follows: In a 125-milliliter Erlenmeyer flask are placed 0.75 gram (0.0038 mole) of 2-hydroxystyryl-α-phenyl-methyl ketone, 0.63 gram (0.0038 mole) of 5-nitrosalicylaldehyde, and 30 milliliters of glacial acetic acid. The solution is maintained at 15 degrees centigrade while hydrogen chloride is bubbled through it until the solution is saturated with it. The solution is allowed to stand at room temperature (20 degrees centigrade) for several days until red crystals form, which are recovered by washing with ether and filtering. The red crystals are hydrolyzed by being dissolved in 10 milliliters of acetone having had added thereto 6 drops of concentrated ammonium hydroxide to form a white spiropyran precipitate, which is purified by repeated recrystallization from an acetone-water solution to yield light yellow crystals of acicular form, which have a melting point range of 184.5 degrees to 185.0 degrees centigrade. This compound is photochromic, turning red-gray, in solution, at room temperature, when subjected to light predominating in blue through ultra-violet components of the light spectrum. The solution will revert to the colorless state in the dark or in the absence of the color-provoking radiation, at room temperature, in several seconds and faster at higher temperatures.

All of the other compounds may be prepared in the same manner. To introduce the selected substituents in the 5'–8' positions, the salicylaldehyde with such selected substituents is condensed with the benzyl methyl ketone. If derivatives are desired in both the benzene rings having the 5', 6', 7', and 8' and the 5, 6, 7, and 8 positions, both of the salicylaldehyde components must have the selected substituents introduced thereon. The substituted salicylaldehydes are generally commercially available or easily made by methods well known in the art.

What is claimed is:

The compound 3-phenyl-6'nitro-spiro(2H,1-benzopyran-2,2'[2'H,1'-benzopyran]) having the structure

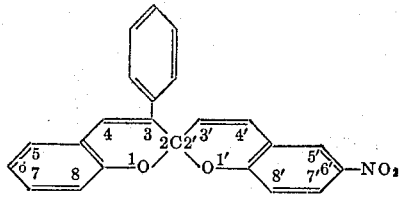

References Cited in the file of this patent

Dickinson et al.: "Journal Chemical Society" (London), part 2 (1927), pages 1699–1705.
Dickinson et al.: "Journal Chemical Society" (London), part 2 (1928), pages 2077–2082.
Mustafa: "Chemical Reviews," vol. 43, pages 510–517 (1948).
Fischer et al.: "Journal Chemical Society" (London), part 4 (1952), page 4524.
Hirshberg et al.: "Journal of Chemical Physics," vol. 21, pages 1619–1620 (1953).
Hirshberg et al.: "Journal Chemical Society" (London), part 1 (1954), pages 297–303.
Hirshberg et al.: "Journal Chemical Society" (London), part 3 (1954), pages 3129–3136.

UNITED STATES PATENT OFFICE
CERTIFICATE OF CORRECTION

Patent No. 3,022,318                        February 20, 1962

Elliot Berman et al.

It is hereby certified that error appears in the above numbered patent requiring correction and that the said Letters Patent should read as corrected below.

Column 1, line 11, for "-[2'H,1-" read -- -[2'H,1'- --.

Signed and sealed this 19th day of June 1962.

(SEAL)
Attest:

ERNEST W. SWIDER
Attesting Officer

DAVID L. LADD
Commissioner of Patents